United States Patent [19]
Vilk

[11] 4,328,023
[45] May 4, 1982

[54] HEAT RETAINING SHIELD IN GLASS GOB FORMER

[75] Inventor: Peter Vilk, London, England

[73] Assignee: B.H.F. (Engineering) Limited, Greenford, England

[21] Appl. No.: 195,835

[22] Filed: Oct. 10, 1980

[30] Foreign Application Priority Data

Oct. 12, 1979 [GB] United Kingdom ............... 35481/79

[51] Int. Cl.³ .............................................. C03B 7/08
[52] U.S. Cl. ...................................... 65/328; 65/330; 65/331
[58] Field of Search ................. 65/325, 326, 328, 330, 65/331, 221, 126, 129

[56] References Cited

U.S. PATENT DOCUMENTS

| | | | |
|---|---|---|---|
| 1,766,638 | 6/1930 | Howard | 65/326 |
| 2,141,425 | 12/1938 | Wadsworth | 65/330 X |
| 3,846,107 | 11/1974 | Foster et al. | 65/330 X |

FOREIGN PATENT DOCUMENTS 2418267  11/1974  Fed. Rep. of Germany ........ 65/328

*Primary Examiner*—Richard V. Fisher
*Attorney, Agent, or Firm*—Cushman, Darby & Cushman

[57] ABSTRACT

In glass gob forming apparatus which includes one or more reciprocatable plungers each mounted above a respective orifice in the floor of a refractory trough such that on axial reciprocation of the plungers in use molten glass is forced in the form of gobs through the orifice, the plungers being surrounded by a refractory cylinder, there is provided a refractory heat insulating body within the cylinder around the plungers.

3 Claims, 1 Drawing Figure

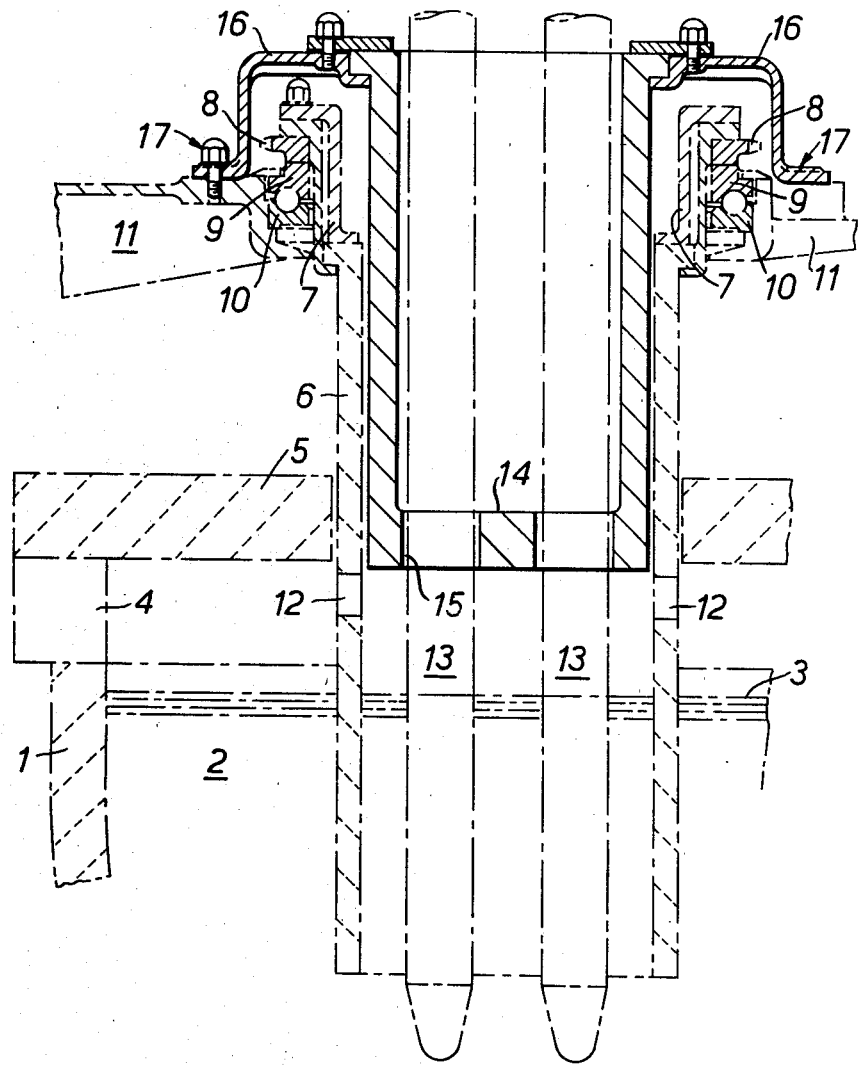

HEAT RETAINING SHIELD IN GLASS GOB FORMER

This invention relates to a heat retaining shield for use in glassware production.

In the production of glassware gobs are formed from molten glass and the gobs are then further processed, e.g. by blow moulding, to the desired shape. Thus the rate of production of a particular manufacturing line is dependant inter alia on the rate of gob formation.

Gobs are produced by forcing molten glass from a refractory trough through an orifice in the trough floor by means of an axially reciprocating plunger. The plunger is mounted above the trough and extends down to the orifice. On the downward stroke of the plunger, it forces molten glass out through the orifice in the trough floor to form the gob. The gob is then cut off as the plunger returns on its upward stroke and is removed for the further processing.

Within the trough and around the plunger there is provided a refractory cylinder. In use this cylinder is revolved about the reciprocating plunger to stir the molten glass in the trough. Further the height of this cylinder above the trough floor is generally adjustable so that by varying its height above the trough floor, and thus also its height above the orifice, the rate of flow of glass to the orifice is varied. In this way it is possible to vary the weight of the gob produced.

The glass in the trough outside the refractory cylinder is generally heated, e.g. by means of burners above the glass surface, to maintain it in a molten state and this outer area of the trough is also covered, e.g. with refractory and insulating brick, to reduce heat loss. However to obtain increased rates of gob formation as demanded by high manufacturing rates it is known to increase the plunger stroke rate and the number of plungers used, i.e. to obtain multiple gob formation. To accommodate increased plunger stroke rate and/or an increased number of plungers it is necessary to increase the diameter of the refractory cylinder which revolves around the plunger(s). This means that the surface area of glass within the cylinder, which is available for heat loss is increased. This in turn means that there is an increased cooling of glass within the cylinder. This cooling results in an increase of the glass viscosity within the cylinder and decreases the efficiency of gob formation. The cooling becomes unacceptable for refractory cylinders of diameter about eight inches and above.

According to the present invention there is provided glass gob forming apparatus which comprises one or more axially reciprocatable plungers each mounted above a respective orifice in the floor of a refractory trough such that on axial reciprocation of the plunger(s) in use of the apparatus molten glass is forced out of the trough through the orifice(s) in the form of gobs, the plunger(s) being surrounded by a refractory cylinder which extends into molten glass in the refractory trough in use and there being provided a refractory heat-insulating body within the cylinder around the plunger(s).

The refractory heat insulating body within the cylinder acts as a heat shield to reduce heat loss from molten glass within the cylinder during use.

The mounting of the heat shield is of course important since in use it surrounds the plunger(s) having an axial moment of movement inside the cylinder which is preferably mounted for revolution during use. Suitably the revolvable cylinder and stationary heat insulating body are mounted on a common mounting. Thus the heat shield is generally mounted on the stationary mounting of the revolvable cylinder of conventional gob-forming equipment. Thus the shield remains stationary while the plunger(s) reciprocate(s) and the cylinder revolves. However when the height of the cylinder is varied, e.g. to adjust gob weight, the height of the heat shield on the common mounting will also be altered.

In use of the apparatus of course the heat shield must be above the molten glass level within the cylinder.

The heat shield is suitably of cast refractory. Preferably the shield is in the form of a blind tube mounted coaxially within the cylinder, the closed end of the tube facing towards the trough floor and the plunger(s) extending through openings in its end. The clearances between the shield and the cylinder and the plunger(s) are chosen such that any heat loss there may be through the gap between the shield, the cylinder and the plunger(s) is at a minimum while still permitting unhindered movement of the cylinder and plunger(s).

Preferably the revolvable cylinder has in its wall a series of apertures. The apertures are above the molten glass level but below the heat shield to allow combustion gases and fumes from burners of the trough to enter the cylinder and thus heat the glass inside.

The invention is further illustrated by way of example in the accompanying drawing which is a section through part of a gob forming apparatus incorporating a heat retaining shield in accordance with the present invention. In the drawing the heat retaining shield and mounting are shown in solid line, the remaining parts of the apparatus being in dash-and-dot line.

With reference to the drawings the apparatus comprises a refractory trough 1 containing molten glass 2 up to a level 3. Burners 4 are provided in the wall of trough 1 above the level 3 and the whole is covered with a roof 5 of refractory to reduce heat loss.

A refractory cylinder 6 extends through the roof 5 into the molten glass 2. This cylinder 6 is revolvably mounted by means of a chuck 7 on a driven sprocket or gear 8. Sprocket or gear 8 is in turn mounted on the upper part 9 of a ball race. The lower part 10 of the ball race is mounted on arms 11. Arms 11, and with them the cylinder 6, may be moved up and down (by means not shown) e.g. hydraulically, pneumatically or mechanically.

A series of apertures 12 are provided in the wall of cylinder 6 above glass level 3 but below roof 5. These apertures allow combustion gases and fumes from burners 4 to enter cylinder 6.

Within cylinder 6 are provided, in this case, two plungers 13. These plungers 13 are mounted independently of cylinder 6 by mounting means (not shown) which permit them to be axially reciprocally driven. The plungers 13 extend down to a pair of orifices (not shown) in the floor of trough 1.

Within cylinder 6 and around the plungers 13 is provided a cast refractory heat shield 14. The heat shield is in the form of a blind tube, the closed end of which has two openings 15 through each of which extends one of the plungers 13. The clearance between the shield and the cylinder wall and plungers 13 is in each case about ¼ inch. The lower, i.e. closed, end of shield 14 is of course above the apertures 12 in the wall of cylinder 6. The shield 14 is mounted at its open end by means of clamps 16 on the arms 11 at 17.

In use the molten glass 2 is supplied to trough 1 and the burners 4 are operative.

Sprocket or gear 8 is driven. Thus cylinder 6 mounted on the sprocket or gear 8 by means of chuck 7 is caused to revolve and thus stir the molten glass. The supporting arms 11 remain stationary during this revolution due to the ball race 9, 10.

Plungers 13 are axially reciprocally driven. On their downward stroke they cooperate with the orifices in the trough floor to force out the molten glass to form a gob. On the upward stroke of the plunger the gobs are cut off and removed for further processing.

While the cylinder 6 revolves and the plungers 13 reciprocate, the refractory shield 14 mounted on arms 11 remains stationary.

The refractory shield 14 reduces heat loss from the glass surface within cylinder 6. Further combustion gases and fumes from the burners 4 enter the cylinder 6 above the glass level 3 through apertures 12. These gases and fumes heat the glass. The presence of shield 14 prevents cylinder 6 from acting as a chimney for the gases and fumes.

When it is desired to raise or lower cylinder 6 so as to adjust the rate of flow of glass to the orifices and thus the gob weight, its supporting arms 11 are raised or lowered as required. Thus at the same time shield 14, which is also mounted on arms 11, is also raised or lowered so that the position of the shield with respect to the apertures 12 is maintained.

I claim:

1. Glass gob forming apparatus which comprises one or more axially reciprocatable plungers each mounted above a respective orifice in the floor of a refractory trough such that on axial reciprocation of the plunger(s) in use of the apparatus molten glass is forced out of the trough through the orifice(s) in the form of gobs, the plunger(s) being surrounding by a refractory cylinder which extends into molten glass in the refractory trough in use, there being provided a refractory heat-insulating tubular shield within the cylinder around the plunger(s) to reduce heat loss from molten glass within the cylinder during use, the heat shield being above the molten glass level within the cylinder and being in the form of a blind tube mounted coaxially within the refractory cylinder, the closed end of the tube facing towards the trough floor and the plunger(s) extending through openings in the end of the tube, the refractory cylinder being spaced from the plunger(s) and the blind tube heat shield extending substantially across the space thereby formed to provide heat insulation.

2. Glass gob forming apparatus according to claim 1 wherein the refractory cylinder is revolvably mounted on the apparatus frame while the refractory heat insulated shield remains stationary during revolution of the refractory cylinder.

3. Glass gob forming apparatus according to claim 2 wherein the refractory cylinder and heat insulating shield are mounted on the apparatus frame by a common mounting which is movable axially with respect to the cylinder.

* * * * *